Nov. 4, 1930.  E. E. EINFELDT  1,780,704
METAL WHEEL AND METHOD OF MAKING THE SAME
Filed Aug. 3, 1929   2 Sheets-Sheet 1
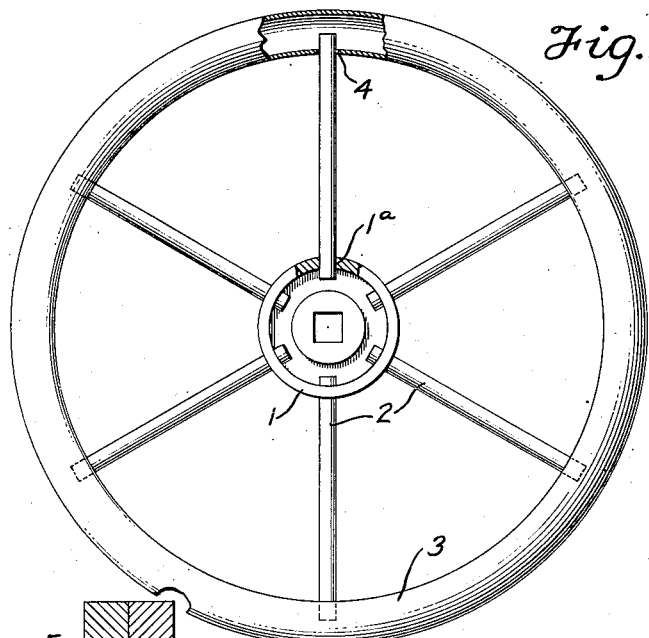
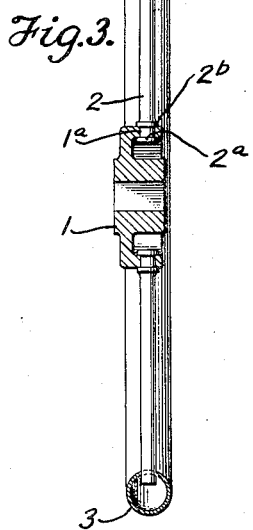
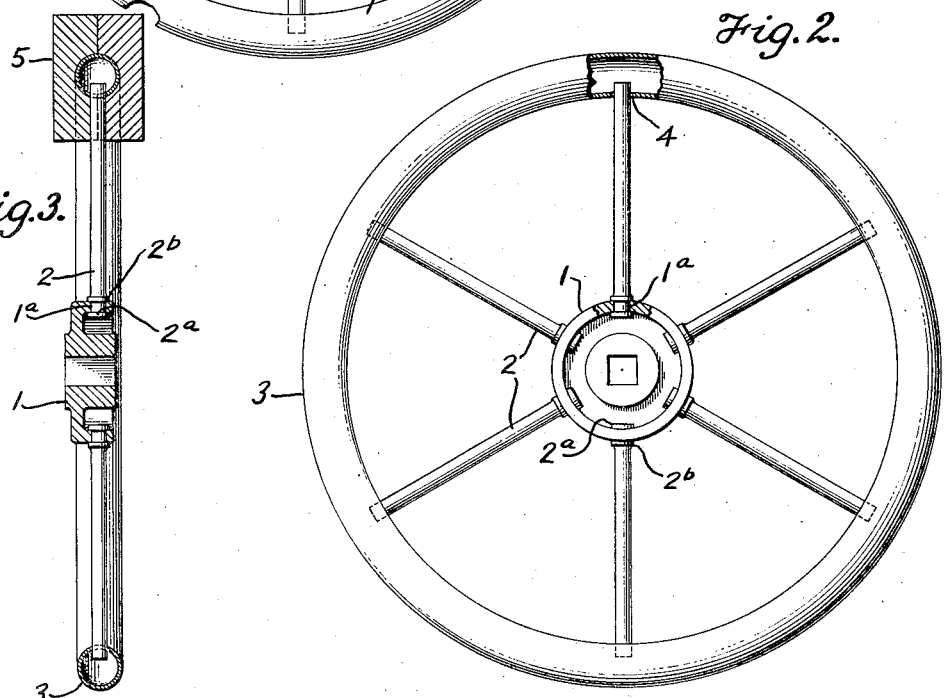
INVENTOR.
E. E. Einfeldt
BY Morrison, Kennedy Campbell
ATTORNEYS.

Nov. 4, 1930.    E. E. EINFELDT    1,780,704
METAL WHEEL AND METHOD OF MAKING THE SAME
Filed Aug. 3, 1929    2 Sheets-Sheet 2
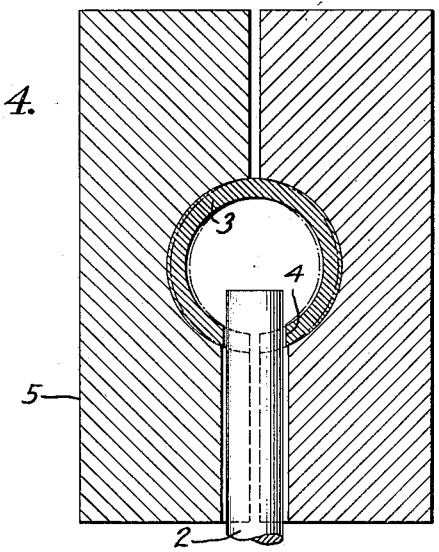
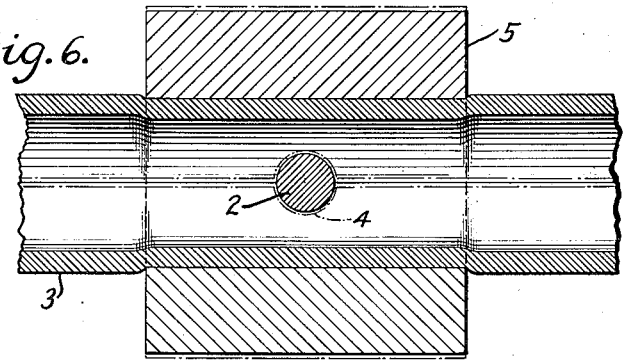
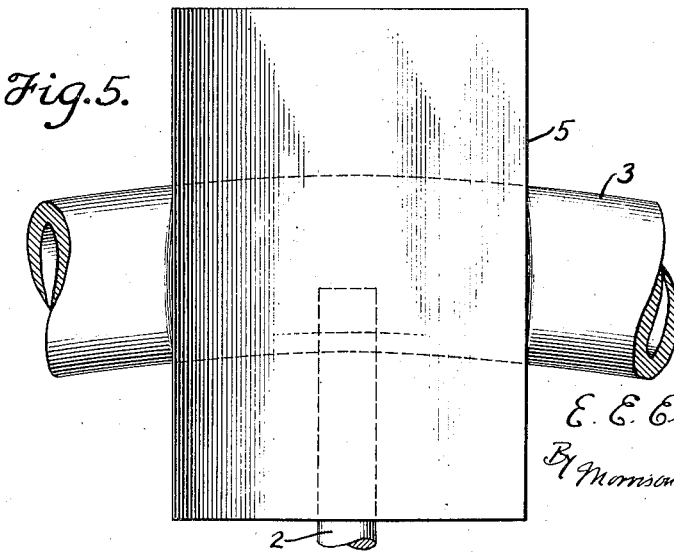
INVENTOR.
E. E. Einfeldt
By Morrison, Kennedy & Campbell
ATTORNEYS Patented Nov. 4, 1930

1,780,704

UNITED STATES PATENT OFFICE

ERNEST E. EINFELDT, OF DAVENPORT, IOWA, ASSIGNOR TO FRENCH & HECHT, INCORPORATED, A CORPORATION OF IOWA

METAL WHEEL AND METHOD OF MAKING THE SAME

Application filed August 3, 1929. Serial No. 383,225.

This invention relates to metal wheels, and to the method of making the same, and has reference more particularly to a wheel in which the rim is of hollow or pipe form, the invention being directed especially to the connection of a rim of this form to the outer ends of the spokes.

In accordance with the invention, a section of tubular form, such as a pipe, is bent into circular or annular form and its ends connected together to constitute the rim, holes being formed in the inner portion of the wall of the same to receive the outer ends of the spokes, and the ends of the spokes being inserted in said holes, the rim at the points of location of the holes, is compressed laterally and thereby permanently deformed, whereby the walls of the holes will be contracted and forced into firm and fixed engagement with the sides of the spokes, and a firm connection of the two will be effected.

Such a procedure lends itself nicely to the formation of a wheel in which all of the spokes will be under uniform tension, such as may exist, and will be of the same length between their points of connection with the hub and the rim; and in making up a complete wheel under these conditions, a hub with holes for the inner ends of the spokes is first placed concentrically within a rim of the form above described, care being taken that the holes in the rim will be of such size that the ends of the spokes extending therein and before the contraction of the walls of the holes, will be free to adjust themselves to the final position they will take when the rim is attached thereto. The spokes are next set in place one at a time with their inner ends entering the holes in the hub and their outer ends entering the holes in the rim. When all of the spokes have been thus assembled, their inner ends are fastened by suitable means to the hub, for instance by the formation of heads on the inner extremities of the spokes bearing against the interior of the hub and shoulders on the spokes bearing against the exterior of the hub. After the spokes have been all thus fastened to the hub, the rim is fastened to the outer ends of the spokes as hereinbefore described, that is by the deforming of the rim to cause the walls of the holes therein to contract on the spokes, the spokes before this final attachment of the rim thereto, having accommodated themselves in the shortening of the same, due to the formation of the heads and shoulders, to the rim, so that the distance between the points of attachment of the spokes to the hub and rim will be uniform throughout, and such tension as the spokes may be placed under by the form of connection described, will be also uniform throughout the series.

In the accompanying drawings:—

Fig. 1 is a plan view of the disconnected parts of the wheel in the first stage of their assemblage;

Fig. 2 is a similar view, showing the inner ends of the spokes connected with the hub;

Fig. 3 is a longitudinal section through the completed wheel, showing the walls of the holes in the rim contracted on the outer ends of the spokes and showing the compression or deforming dies for effecting such contraction.

Fig. 4 is a sectional elevation on an enlarged scale, showing the compressing dies acting on opposite sides of the rim to deform the same and contract the walls of the holes of the spokes, Fig. 5 is a side elevation of the same, showing the deformation of the rim by the action of the dies, and Fig. 6 is a longitudinal section through the same.

Referring to the drawings:—

The completed wheel as shown in Fig. 3, comprises a hub 1, spokes 2 fixedly connected thereto at their inner ends, and a rim 3 of hollow form, which rim is conveniently made by bending a section of commercial pipe into circular or annular form and welding the ends of the same together. The outer ends of the spokes protrude through holes 4 in the inner side of the rim, and the walls of these holes are contracted tightly on the sides of the spokes in firm engagement therewith, whereby the connection of the rim with the spokes is effected.

In the manufacture of a completed wheel of this form with the rim connected with the spokes as shown, the hub provided with holes 1ª to receive the inner ends of the spokes, is first assembled concentrically within the annular rim, as shown in Fig. 1, the diameter of the holes 4 in the rim being such as to permit the spokes to move freely endwise therethrough for the purpose presently to be described. The spokes are now inserted one at a time with their inner ends in the holes in the hub and their outer ends protruding through the holes in the rim, until all of the spokes have been set in place. By suitable means, the inner ends of the assembled spokes are fastened rigidly and fixedly to the hub. This may be accomplished in a variety of ways, but I perfer to form heads 2ª on the inner ends of the spokes to bear against the interior of the hub, and shoulders 2ᵇ on the spokes to bear against the exterior of the hub. In the formation of these heads and shoulders, which is effected by an upsetting operation, the spokes will contract endwise more or less, and in such contraction, due to the fact that the holes in the rim are of sufficient size to permit the spokes to move endwise therethrough freely, the spokes will accommodate themselves to the rim. The wheel in this stage of its formation is shown in Fig. 2. It remains now to fasten the rim to the outer ends of the spokes protruding through the holes therein, and this in accordance with the present invention is effected by subjecting the rim at the points of location of the holes, to a lateral compression in such a manner as to locally deform the rim at these points and thereby contract the opposite side walls of the holes 4 therein tightly on and in fixed and firm engagement with the sides of the spoke ends, whereby the rim will be connected firmly and fixedly to the outer ends of the spokes.

The deformation of the rim to bring about this result may be accomplished in various ways and by various means, but I prefer to employ for the purpose, compression mating dies 5 formed in their inner sides with recesses to receive the sides of the rim and adjacent portion of the spoke, which dies when brought together under sufficient pressure, will deform the rim and contract the side walls of the holes 4 therein and force said walls in firm and fixed engagement with the sides of the spoke.

While in the foregoing description and accompanying drawings I have set forth the invention as embodying certain details both in respect to the formation of the parts and the method of procedure, it will be understood that these details may be variously changed and modified without departing from the spirit of the invention; and further, it will be understood that the invention is not limited to any particular form or construction of the parts or the method of procedure, except in so far as such details are set forth in the claims.

Having thus described my invention, what I claim is:—

1. The method of making metal wheels, which includes providing an annular hollow rim having holes therethrough to receive the spoke ends, inserting the ends of the spokes in said holes, and fastening the rim to the spokes by deforming the rim to force the walls of the holes in firm engagement with the spokes.

2. The method of making metal wheels, which includes providing an annular hollow rim having holes in its inner side to receive the spoke ends, inserting the ends of the spokes in said holes, and fastening the rim to the spokes by deforming said rim at the points of location of the holes to force the opposite walls of the holes laterally against the sides of the spokes.

3. The method of making metal wheels, which includes providing an annular hollow rim having holes to receive the spoke ends, inserting the ends of the spokes in said holes, and compressing the rim laterally at the points of location of the holes, to deform the rim and contract the walls of the holes on the spokes.

4. The method of fastening a hollow wheel rim to spokes, which consists in inserting the outer ends of the spokes respectively in the holes in the rim, and deforming the rim to force the walls of the holes laterally and fixedly in contact with the sides of the spokes.

5. The method of fastening a hollow wheel rim to spokes, which consists in inserting the outer ends of the spokes respectively in holes in the rim, and deforming the rim at the points of location of the holes to force the opposite walls of the holes laterally and fixedly against the sides of the spokes.

6. In a metal wheel, the combination of a hub, spokes fixed thereto, and a hollow rim formed with holes in which the outer end of the spokes extend, said rim being permanently deformed at points adjacent the location of the holes, and the side walls of the latter being in firm and fixed engagement with the sides of the spokes.

7. In a metal wheel, the combination of a hub, spokes fixed thereto, and a hollow rim formed on its inner side with holes, the outer ends of the spokes protruding through said holes and terminating in the interior of the rim, and the rim being deformed at the points of location of the holes with opposite walls of the holes in firm and fixed engagement with the sides of the spokes.

In testimony whereof, this specification has been duly signed by:

ERNEST E. EINFELDT.